July 10, 1945.  H. D. GIFFEN  2,380,231
APPARATUS FOR ANALYZING RECORDED DATA
Filed March 8, 1943  2 Sheets-Sheet 2
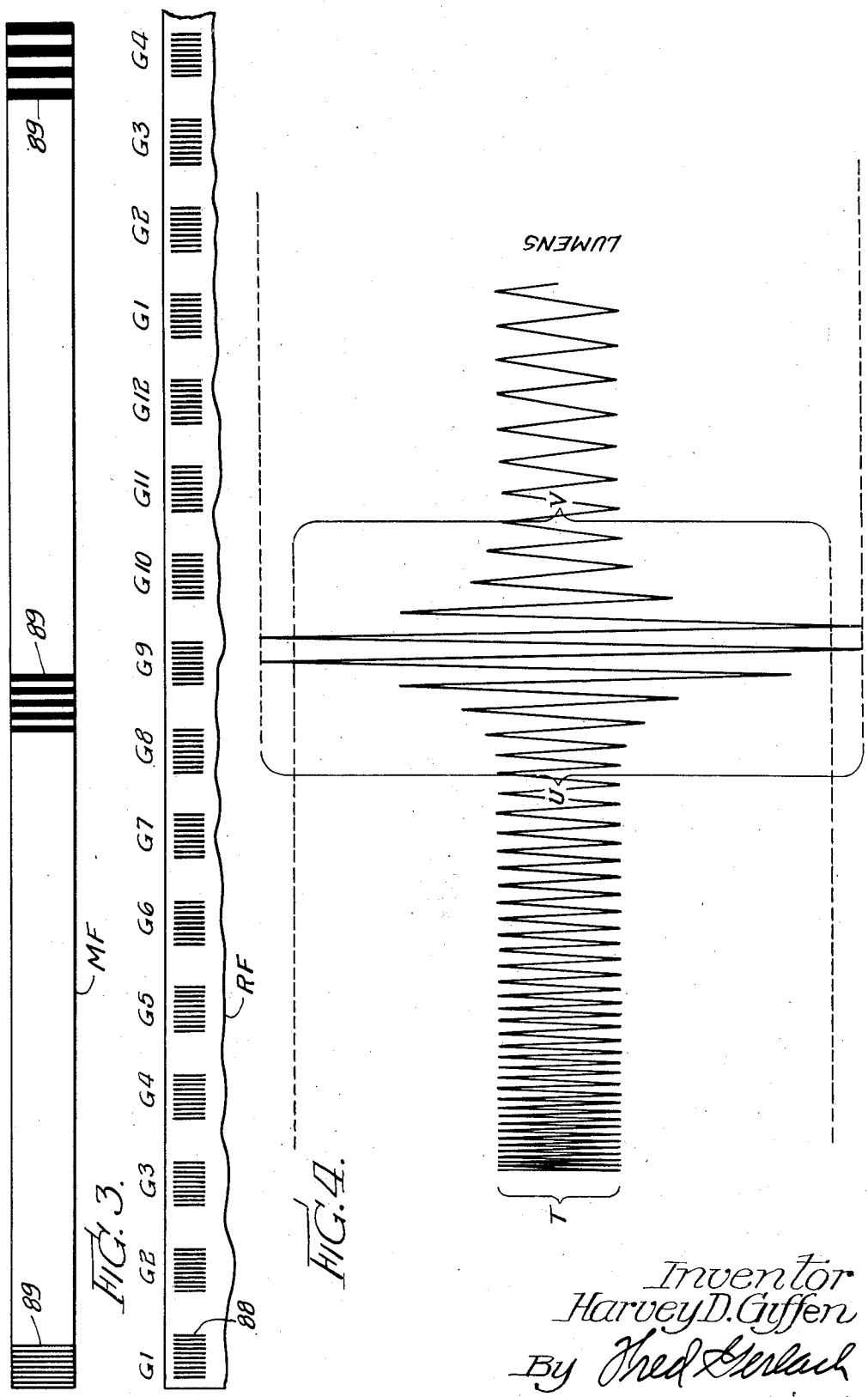

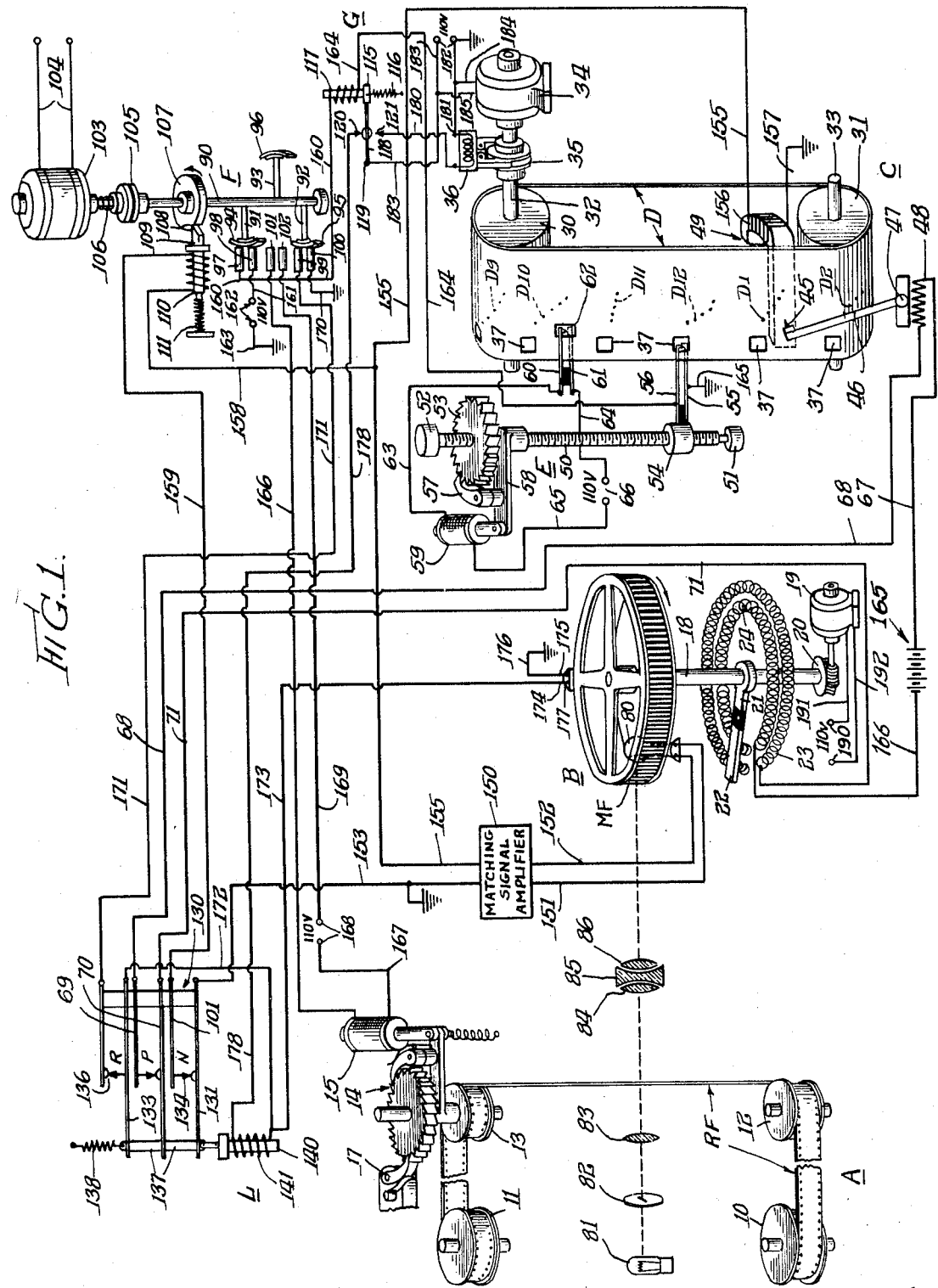

Patented July 10, 1945

2,380,231

UNITED STATES PATENT OFFICE 2,380,231

APPARATUS FOR ANALYZING RECORDED DATA

Harvey D. Giffen, Pico, Calif., assignor, by mesne assignments, to Consolidated Vultee Aircraft Corporation, a corporation of Delaware Application March 8, 1943, Serial No. 478,367

6 Claims. (Cl. 234—1.5)

In my copending application Serial No. 458,224, filed September 14, 1942, there is disclosed a method of and an apparatus for transmitting and recording the changes which occur in different parts of an aeroplane when in flight, as determined by detector devices or gauges located on the different parts of the aeroplane. More particularly there is disclosed in said application, as an exemplary embodiment of the invention, an apparatus for recording changes in a plurality of detector devices or gauges by making separate recordings for each gauge in such rapid sequence that they are substantially simultaneous, and by repeating such sequence recording at extremely short intervals of time to provide thereby a record (on a film) which can thereafter be analyzed to give separate and substantially continuous records of the changes, the apparatus embodying a beat frequency oscillation, one component of which is caused to vary in pitch according to the stimuli being studied and providing an audio frequency signal suitable for recording.

The present invention relates to apparatus for analyzing data on a record obtained in utilizing the principles of the method and apparatus of said prior application, and more particularly apparatus for analyzing data from a plurality of gauges recorded in repeated sequence on a film, and for plotting a plurality of curves, each representing the data from a single gauge.

It is an object of the invention to provide a new and improved apparatus for analyzing recorded data.

It is another object to provide a new and improved apparatus for analyzing data from a plurality of gauges in the form of variable frequency markings and which includes means for comparing the markings with similar markings on a master film containing markings varying over the entire range of the gauges.

Another object is to provide a novel apparatus for analyzing data representing changes in a plurality of gauges and for charting the analyzed data to provide a plurality of curves, one for each gauge.

Another object is to provide an analyzing apparatus including a photo electric or light responsive cell, means including a master film for scanning the record film and controlling the passage of light from a source to said cell, and mechanism responsive to signals generated in the cell circuit to chart into separate curves the data from the analyzed data.

Other objects and advantages will become readily apparent from the following description, taken in connection with the accompanying drawings, in which:

Figure 1 is a diagrammatic representation of a preferred form of the invention;

Figure 2 is an enlarged developed view of a master film used in form of the invention illustrated in Figure 1;

Figure 3 is an enlarged fragmentary view of a record film; and

Figure 4 is a curve showing the variations in the total light, in lumens, reaching the photo electric cell of the apparatus of Fig. 1 during a scanning operation.

While the invention is susceptible of embodiment in many different forms, there is shown in the drawings and herein described in detail one such embodiment particularly adapted to analyze data recorded on a film, with the understanding that the present disclosure is to be considered as an exemplification of the principles of the invention and is not intended to limit the invention to the embodiment illustrated. The scope of the invention will be pointed out in the appended claims.

As illustrated in the drawings the invention is embodied in an apparatus comprising a record film supporting and advancing means A, for a record film RF, a master film or scanning mask MF carried on a rotatable drum B, a chart supporting and operating mechanism C, for supporting an endless chart D and advancing it section by section, a chart feed mechanism E which functions after each complete cycle of chart movement to advance the chart a fraction of a section, a motor operated switch F, and control relays G and L.

The record film supporting and advancing means A comprises a reel 10 from which the record film RF is drawn, a reel 11 onto which the film is wound, guide and drive wheels 12 and 13 which have suitable prongs or teeth engaging into the edge apertures in the film, a pawl and ratchet device 14 for moving the film with a step by step motion, and a solenoid 15 for actuating the pawl of the device 14. The ratchet part of the device 14 is connected to the drive wheel 13. A spring 16 is provided to return the pawl of the device 14. A holding pawl 17 serves to hold the ratchet in its advanced position.

The drum B, which carries the master film MF, is supported on a rotatably mounted shaft 18, the axis of which is parallel to the axes of the record film guide rollers 12 and 13 and in a vertical plane perpendicular to the portion of the film RF which is stretched between the rollers 12 and 13. The drum shaft 18 is arranged to be driven by an electric motor 19, through reduction gearing 20, at approximately one revolution per second. The drum shaft carries an arm 21 which has a contact 22 insulated and extending therefrom to wipe across annular rheostat resistance coils 23 and 24 which are concentric with the shaft, so as to vary the resistance in an associated circuit hereinafter described. As illustrated in Fig. 1, the drum B is in what may be termed its starting position, and is arranged to rotate in the direction of the arrow.

The chart supporting and operating mechanism C includes spaced paralled rollers 30 and 31 mounted respectively upon rotatable shafts 32 and 33. The roller 30 is arranged to be driven intermittently by an electric motor 34 through a magnetic clutch 35 engageable by energizing a solenoid 36. The chart D is shown provided with a plurality of uniformly spaced apertures 37 which are continued throughout the length of the chart and divide the chart into sections, each one of which is used for plotting a separate curve which will represent the data from a separate gauge. The magnetic clutch 35 is periodically engaged to advance the chart section by section with respect to a pen 45. The pen 45 is carried on the free end of a swinging arm 46 which is pivotally mounted at 47 and is operable by means of an electromagnet having a coil 48. In practice a D. C. volt meter mechanism has been used for this purpose with the control of the voltage on the coil 48 residing in the circuit which includes the rheostat coils 23, 24. The arm 46 is mounted so that normally during the swinging movement thereof the pen 45 is out of contact with the chart. The pen is arranged to be moved towards the chart to mark it, at the appropriate time during the swinging movement of the arm, by means including an electromagnet 49.

The chart feed mechanism E includes a screw shaft 50 rotatably mounted in suitable bearings 51 and 52 and carrying a ratchet wheel 53. A nut 54 on the screw shaft is guided for movement longitudinally of the shaft by suitable means (not shown) and carries a pair of contact arms 55 and 56 forming a chart indexing switch device, the arm 55 being positioned to the rear of the chart D and the arm 56 positioned in front of the chart. These arms are so adjusted that when one of the apertures 37 passes the arms, the arms engage through the aperture and close a control circuit to the relay G.

The ratchet 53 is arranged to be actuated by means of a pawl 57 carried on an arm 58 swingably supported on the shaft 50 and operable by means of a solenoid 59. The solenoid 59 is arranged to be actuated once at the end of each complete cycle of movement of the chart D so as to advance the chart about an eighth of an inch with respect to the pen 45 so that the subsequent markings of the pen on each chart section during the next cycle of chart movements, are spaced vertically apart by this distance, to outline a curve on each section. The control of the solenoid 59 is in a chart feed switch device having contact arms 60 and 61 stationarily mounted with respect to the chart D. The arm 61 passes behind the chart and the arm 60 in front of the chart so that when a single aperture 62 in the chart passes these arms the arms engage and close a circuit through wires 63, 64 and 65 to the solenoid 59 and a source of electric power indicated by the terminals 66.

The circuit associated with the rheostat coils 23, 24 includes a battery or other source of direct current 165, one terminal of which is connected to coil 24 by a wire 166 and the other terminal of which is connected to one end of the pen arm operating coil 48 by a wire 67. The other end of the coil 48 is connected by a wire 68 to a contact 69 of the relay L, the associated contact 70 of which is connected by a wire 71 to one end of the rheostat coil 23. When the drum B is in its starting position (as shown) the entire resistance of the coils 23 and 24 is connected in series circuit with the pen operating coil 48 so that there is a minimum voltage impressed upon this coil. As the drum B turns through a single revolution in the direction indicated by the arrow, the resistance in this circuit is gradually reduced with the result that the pen supporting arm 46 swings toward the right from the position shown, and across the chart D. In this way the pen supporting arm is moved from its left hand position all the way to its right hand position during the complete rotation of the drum B unless prior to the completion of the revolution the circuit including the coil 48 is opened to permit the arm to swing back to its initial position, as hereinafter more fully described.

In the form disclosed herein it is contemplated that the chart D will have as many sections as there were gauges used to record data on the record film RF, and that each chart section will be used to plot the data corresponding to a different gauge. The chart is advanced section by section, a cycle of the chart movement being completed when all sections have passed the pen 45 once and the chart has then been fed forward about one-eighth inch by the mechanism E. The cycle is then repeated a sufficient number of times to analyze the entire record on the film RF.

Associated with the drum B is a photo electric or light responsive cell 80 positioned within the drum and in a location so as to be subjected to a light beam passed through the master film MF from a light source 81. The light source includes an apertured member 82 for limiting the size of the beam of light and a lens system including lenses 83, 84, 85 and 86 for defining the light beam. The beam passes through a section of the record film RF which is positioned intermediate the lenses 83 and 84 and after leaving the lens 86 passes through the master film MF before striking the cell 80.

The motor operated switch F is of a rotating drum type with a rotatably mounted shaft 90 carrying radially extending contact arms 91, 92 and 93. Arcuate contacts 94, 95 and 96 are carried on and insulated from said arms. Contact 94 is arranged to connect together a pair of switch fingers 97 and 98 and contact 95 is arranged to connect together switch fingers 99 and 100, when the drum shaft is in the position shown in Fig. 1. Contact 96 is arranged to connect together switch fingers 101 and 102 momentarily when the shaft 90 is rotated through a single revolution which first causes the contacts 94 and 95 to disconnect their associated fingers. As shown herein, the shaft 90 is arranged to be driven by a motor 103 (which runs continuously when the apparatus is in use) connected to a power source as by wires 104. A friction type slip clutch 105 is provided to connect the motor shaft 106 with the drum shaft 90. A cam 107 on the shaft 90 has a radial abutment 108 at one point on its periphery, which is engageable by a detent plunger 109. When this plunger is in the position shown in Fig. 1 the shaft 90 is held against rotation, the clutch 105 then slipping. When the detent plunger is withdrawn, as by momentarily energizing a relay coil 110, the drum shaft 90 is turned through a single revolution in the direction indicated by the arrow. During this movement the detent plunger is urged against the periphery of the cam 105 by a spring 111, so as again to engage the abutment 108 and arrest the movement of the shaft 90.

The control relay G as shown in Fig. 1, has an armature 115 urged downwardly by a spring 116 and moved upwardly when a coil 117 is energized. The parts are shown in the positions assumed when the coil is energized. A switch arm 118 is pivoted at 119 and has its free end connected to the armature 115. When the coil 117 is energized this switch arm engages a stationary contact 120 and is disengaged from a stationary contact 121. When the coil is de-energized the switch arm swings in a clockwise direction to disengage from the contact 120 and engage the contact 121.

The control relay L has a stationary support 130 comprising insulating members separating switch arms 131, 70 and 133, and associated contacts 134, 69 and 136, respectively. The free ends of the arms are connected together by insulating members 137 and are normally held in their upper positions (as shown in Fig. 1) by a tensioned spring 138. Under this conditions switches N, P and R (formed by the arms and contacts) are closed. A relay armature 140 is connected to the lower end of the insulating members and is arranged to pull said members downwardly and disengage said switches when the relay coil 141 is energized.

The circuit connections of Fig. 1 will now be described in detail.

The photo electric cell 80 is connected to a matching signal amplifier indicated generally at 150 by wires 151 and 152. An output wire 153 from the amplifier leads to the switch arm 131 of the relay L. Another output wire 155 from the amplifier leads to one end of a coil 156 for the electromagnet 49 which when energized causes the pen 45 to place a mark on the chart D. The other end of this coil is connected to ground by a wire 157. The amplified signal from the photo cell 80 is also used to energize the coil 110 of the motor operated switch F, a wire 158 running from the wire 155 to one end of the coil 110 for this relay. A wire 159 leads from the other end of the coil 110 to the contact 134 of the switch N of relay L.

Contact finger 97 of drum switch F is connected by a wire 160 to one end of the coil 117 for relay G. Contact finger 98 is connected by a wire 161 to one side of a 110 volt source of electric power 162, the other side of which is grounded as indicated at 163. The other end of the coil 117 is connected by a wire 164 to the contact arm 56 of the chart feed switch device. The other contact arm 55 of this switch device is connected by a wire 165 to ground. Contact finger 101 of switch F is connected by a wire 166 to one end of solenoid 15, the other end of which is connected by a wire 167 to one side of a 110 volt power source 168. The other side of this power source is connected by a wire 169 to switch contact finger 102. Thus the circuit to the solenoid 15 is completed when the drum switch F is operated and contact 96 engages fingers 101 and 102.

Contact finger 100 of switch F is connected to ground by a wire 170. Contact finger 99 is connected by a wire 171 to contact 136 of switch R in relay L. Contact arm 133 of this switch is connected by a wire 172 to one end of coil 141 of relay L. This same end of the coil is connected by a wire 173 to a stationary contact 174 located adjacent the master film drum B. A second contact 175 is located beside contact 174 and is grounded by a wire 176. Contacts 174 and 175 are arranged to be bridged by a contact 177 carried on and insulated from the drum B, and in a position on the drum enabling contact 177 to connect contacts 174 and 175 when the drum B is in its starting position as shown. The other end of coil 141 of relay L is connected by a wire 178 to contact 120 of relay G.

The other stationary contact 121 of relay G is connected by a wire 180 to one end of the solenoid 36 of the magnetic clutch 35, the other end of which is connected by a wire 181 to one side of a 110 volt power source 182. The movable contact arm 118 of relay G is connected by a wire 183 to the other side of the power source 182. Motor 34, which runs continuously during the operation of the apparatus is connected to the power source 182 by wires 184 and 185 which lead from the motor to wires 181 and 183.

There is illustrated in Fig. 3 a portion of the record film RF obtained in the use of a transmission and recording apparatus of the type disclosed in my said copending application Serial No. 458,224. The record film is marked with data from twelve different gauges as indicated by the marks G1 to G12. The vertical line markings on this film vary in width of line and in width of spaces between lines in accordance with changes in the gauges for which the record is made. Thus, the group of lines G1 on this film represent the condition of a certain gauge at the time the marks were recorded. The next group of lines G2 represents the condition of another gauge, at substantially the same time. Assuming that twelve gauges were used, the first twelve groups of marks represent one recording from each gauge, after which the recording cycle is repeated.

An important feature of this invention lies in the means used for analyzing the marking on the record film RF. This means includes the master film MF, a development of which is shown in Figure 2. This master film is provided with similar line markings 89 which vary in width and in spacing gradually from a minimum to a maximum, beginning at the starting point of the drum and continuing throughout its periphery. Thus, during a single revolution of the drum B there passes between the light source and the light cell 80 a series of markings as shown in Figure 2 which vary over the entire frequency range for which the recording apparatus of said copending application is adjusted. Because of the location of the record film RF, the light beam is interrupted first by the markings on the record film. With the markings as shown, that is consisting of a plurality of parallel black lines, the light beam passes only through the spaces between the lines with the result that the light reaching the master film is actually in the form of a plurality of slender parallel beams. The size of the original beam striking the left hand side of the film RF (Fig. 1) is constant as determined by the aperture in the member 82.

With the record film RF stationary and the master film moving, but with the markings of the master film MF passing the light beam not matching the markings on the record film RF, the total light reaching the cell 80 is never wholly cut off by the master film nor does it ever reach an amount equal to the total light passing through the record film. In other words, the master film markings, when not matched with the record film markings, reduce the total light reaching the cell but do not prevent all of the light from reaching the cell. When the markings on the master film do match with those on the record film the light reaching the cell 80 alternates momentarily from a maximum to zero, the maximum being equal to the total light passing through the record film RF. Therefore, the maximum amount of light change on the cell 80 occurs when the markings on the master film match those on the record film.

In Fig. 4 there is illustrated diagrammatically by a wave form curve the variations in the total light reaching the light cell 80 when the master film MF passes through non-matching and matching portions of its movement. As the master film passes across the image of the record film markings, it causes a fluctuation in the light as indicated by the portion T of the curve, when the record film markings are not matched. At the moment the master film matches the record film markings, the markings on the two films alternately match on top of each other (passing the maximum total light to the cell 80) and between each other (passing no light to the cell 80). This causes a rapid fluctuation of the magnitude represented by the part U of the curve. The effect of the increased magnitude of the light fluctuation on the cell 80 occurring when the master film matches with the record film markings is a rise or surge of current in the cell circuit. When the magnitude of the light fluctuation reaching the cell equals or exceeds the value V this current surge or signal is effective, when amplified, to energize the electromagnet 49 which causes the pen 45 to mark the chart, the pen then having a position crosswise of the chart proportional to the movement of the master film from its starting position.

As illustrated in Fig. 1, the motor 19 for drum B is connected to a power source 190 by wires 191 and 192. It is contemplated that the various power sources indicated in Fig. 1 will be under the control of a single switch (not shown) which controls the starting and stopping of the apparatus.

The operation of the apparatus will now be described. Assuming, with reference to Fig. 1, that the light source 81, amplifier 150 and motors 19, 34 and 103 are in operation and a record film RF has been partly analyzed as indicated by the part curves D1, D9, D10, D11 and R12 on chart D. The record film RF has been moved to present the next group of markings and the master film drum B is in and passing through its starting position.

As the master film drum turns the cell 80 is subjected to a fluctuating light beam which passes through the record film RF and the master film. As long as the master film markings do not match with those on the record film, this scanning operation results in a current in the cell circuit too weak to operate the marking mechanism. However, the pen carrying arm 46 swings across the chart D with a movement proportional to the movement of the drum B from its starting position.

When, during the scanning operation, the markings on the master film match with those on the record film, the total light reaching the photo cell 80 rises suddenly as indicated in Fig. 4, by the bracket U. This causes a current surge in the light cell circuit sufficient, when amplified in the matching signal amplifier 150, to energize the electromagnet 49 and draw the pen arm 46 towards the chart D so that the pen marks the chart. The amplified matching signal current passes through wire 155 to the magnet coil 156. Since the pen arm 46 is then in a position transversely of the chart corresponding to the distance the drum B has moved from its starting point, the mark placed on the chart represents the value or frequency of the markings on the record film RF.

In addition to energizing the electromagnet 49, the amplified surge or matching signal current energizes the relay coil 110, the circuit for this current including wires 155 and 158, coil 110, wire 159, switch N of relay L (which switch is then closed as shown in Fig. 1), and wire 153. Energization of relay coil 110 withdraws detent plunger 109 and permits motor 103 to operate switch F by a single revolution of shaft 90. This operation of the switch causes a momentary opening of the circuits through contacts 94 and 95 and a momentary closing of a circuit by contact 96.

Contact 94 controls the circuit of the coil 117 of relay G which extends from the power source 162 through wire 161, fingers 98 and 97, wire 160, coil 117, wire 164 and contact arms 56 and 55. When this circuit is opened, spring 116 pulls down the armature 115 of relay G and causes switch arm 118 to disengage from contact 120 and to engage contact 121. This closes the circuit to the magnetic clutch 35 (from 182 through 183, 118, 121, 180, 36, 181 and back to 182) and causes the motor 34 to advance the chart D. Movement of the chart causes separation of the contact arms 55, 56, thus maintaining the circuit to coil 117 disrupted until the chart advances a full section and the contact arms reach the next aperture 37. The disengagement of arm 118 from 120 broke the circuit from the upper end of coil 141 to the high side of power source 182 through 178, 120, 118 and 183, thus deenergizing coil 141 and opening switches N, P and R. Contact 95 of drum switch F controls a circuit to the lower end of coil 141 of relay L, this circuit comprising 170, 100, 95, 99, 171, 136, 133, 172, 141, 178, 120, 118, 183 and 182. (Since drum B is then out of its starting position the connections between the lower end of coil 141 and ground, through 173, 174, 175 and 176 are broken between 174 and 175.) Thus, when drum switch F is operated the circuit to relay coil 141 is broken momentarily by contact 94 through relay G and also by contact 95.

When contact 96 of drum switch F engages fingers 101, 102 it closes a circuit to energize solenoid 15 and advance the record film RF to its next markings. This circuit is from power source 168 through 167, 15, 166, 101, 96, 102 and 169 to the other side of 168.

When the relay L is deenergized during the above operations, the opening of switch P breaks the circuit comprising the pen arm actuating coil 48 and 68, 69, 70, 71, 23, 22, 24, 66, 65 and 67, so that the pen arm returns to its left hand position corresponding to the starting position of the drum B. At the same time, opening the switch N of relay L, breaks the circuit to the coil 156 of the pen marking electromagnet 49 and prevents the pen from making additional marks on the chart during this cycle and while the chart is being advanced.

As soon as the chart D has advanced a full section and contact arms 55, 56 are again engaged through the next aperture 37, coil 117 of relay G is again energized since drum switch F has by that time completed its operation and contact 94 again engages fingers 97, 98. Upon energization of relay G the contact arm 118 swings up to engage contact 120 and close the circuit from the high side of power source 182 to the upper end of coil 141 of relay L. Disengagement of contact arm 118 from contact 121 breaks the circuit to the magnetic clutch solenoid 36 and stops the chart.

Although the relay G closes the circuit to the upper end of the coil 141 of relay L, this coil does not become energized again (so as to close switches N, P and R) until the master film drum B reaches its starting position. When this position is reached, contact 177 on the drum bridges contacts 174 and 175 and closes the ground circuit to the lower end of coil 141 through 173, 174, 177, 175 and 176. This causes the coil 141 to be energized and closes the relay switches N, P and R so that the apparatus is ready to start the next cycle, the record film RF having been advanced as hereinbefore pointed out. Preferably the motor 19 for the drum B runs continuously so that no time is lost between cycles.

Although contact 177 on drum B engages the contacts 174, 175 only momentarily, the coil 141 of relay L remains energized through a holding circuit which comprises wire 172, switch R, wire 171, fingers 99 and 100, contact 95 of drum switch F and ground wire 170. The cycle is then repeated again and again, until all of the markings on the record film RF have been analyzed and plotted into twelve different curves on the chart D. As shown in Fig. 1 the curves are partly completed, five marks having been made for each curve and the chart feed to start the sixth cycle.

Each time the chart D has been advanced through all twelve sections the aperture 62 therein permits the contact arms 60, 61 to engage and close the circuit to the solenoid 59. This causes a single feed movement of arm 58 and pawl 57 and a corresponding feed movement of the contact arms 55, 56 upwardly. Suitable means (not shown) can be provided for resetting the feed mechanism E to a starting position when a new chart is inserted in the apparatus.

I claim:

1. An apparatus for analyzing and charting variable frequency data from a plurality of gauges which are recorded on a record film in repeated series groups comprising, in combination, means for supporting and advancing an endless chart through a plurality of stations, one for each group of a series, means for feeding the supporting means through a fraction of the distance from one station to another after each series of groups, a marking tool movable across a chart on said supporting means, electrical means for moving said tool forwardly across a chart including a rheostat, electrical means for causing said tool to mark a chart, and means for controlling said tool marking means comprising a light responsive cell, a light source directed thereon and partly interrupted by a group of marks on a record film being analyzed, a master film arranged in endless form on a rotating drum so as to be between the light source and light cell and having thereon marks varying from a minimum to a maximum and complementary to the marks on record films which the apparatus is adapted to analyze so that when the marks on the master film match with those upon a record film the total light from the source is alternately a maximum and cut off from the light cell and creates an alternating current surge effective to cause operation of said tool marking means, means for rotating said drum and simultaneously controlling the rheostat of said electrical means so that said tool moves transversely across a chart in proportion to the angular displacement of the drum from its starting point wherein the minimum marks thereon intercept the light to the light cell.

2. In an apparatus for analyzing data on a record film recorded from gauge devices, in combination, a light responsive device, a light source directed thereon, means for supporting a record film so that the light beam passes through it and is interrupted in part by the data markings thereon, a scanning means interrupting the light beam having markings thereon varying over the range of the markings on a record film, a marking device swingable back and forth across a space adapted to be occupied by a chart, and means for moving said device in at least one direction from a starting position in accordance with movement of the scanning means from a starting position, and a circuit including said light responsive device and an actuator operable when the scanning means reaches a matching position, to cause the marking device to mark a chart in said chart space.

3. An apparatus for analyzing recorded data comprising, in combination, record advancing means, scanning means including a rotatable mask structure, a rheostat having a contact arm rotatable with said mask structure, a multiple station chart supporting means including a rotatable member for moving an endless chart step-by-step through a complete operating cycle, chart marking means including a marking device movable transversely across a chart on said supporting means during each revolution of the mask structure, means for rotating said member, means for rotating said mask structure, an actuating coil for said marking device connected in series with said rheostat and a source of electrical energy, means operable when the mask structure is in matching position during rotation thereof to cause the marking device to make a mark in the position it has then reached transversely across a chart, means operable when the mask structure reaches a matching position to actuate a switch device and cause the advance of the chart supporting means from one station to the next and to actuate the record advancing means, a relay having an actuating coil controlled by said switch device and by a switch closed once during each revolution of the scanning mask structure and energized when either said switch device or said switch is closed, said relay including contacts in series with said rheostat and operable when opened to cause the marking device to move to a withdrawn position, and means to advance the chart supporting means a fraction of the distance between stations upon the completion of a full cycle of its movement.

4. An apparatus for analyzing recorded data comprising, in combination, record advancing means, scanning means including a rotatable mask structure, a rheostat having a contact arm rotatable with said mask structure, a multiple station chart supporting means including a rotatable member for moving an endless chart step-by-step through a complete operating cycle, chart marking means including a marking device movable transversely across a chart on said supporting means during each revolution of the mask structure, means for rotating said member, means for rotating said mask structure, an actuating coil for said marking device connected in series with said rheostat and a source of electrical energy, means operable when the mask structure is in matching position during rotation thereof to cause the marking device to make a mark in the position it has then reached transversely across a chart, and means operable when the mask structure reaches a matching position to actuate a switch device and cause the advance of the chart supporting means from one station to the next and to actuate the record advancing means.

5. An apparatus for analyzing recorded data comprising, in combination, record advancing means, scanning means including an endless mask, a rheostat having a contact arm movable synchronously with said mask, a multiple station chart supporting means including a rotatable member for moving an endless chart step-by-step through a complete chart operating cycle, chart marking means including a marking device movable transversely across a chart on said supporting means during each cycle of operation of the mask, means for rotating said member, means for moving said mask, an actuating coil for said marking device connected in series with said rheostat and a source of electrical energy, means operable when the mask is in matching position during movement thereof to cause the marking device to make a mark in the position it has then reached transversely across a chart, means operable when the mask structure reaches a matching position to actuate a switch device and cause the advance of the chart supporting means from one station to the next and to actuate the record advancing means and to cause the marking device to move to a withdrawn position, and means to advance the chart supporting means a fraction of the distance between stations upon the completion of a full cycle of its movement.

6. An apparatus for analyzing a record having repeated series of markings comprising, in combination, record advancing means, scanning means including an endless mask movable through a complete cycle of operation during each operation of the apparatus, a multiple station chart supporting means including a rotatable member for moving an endless chart step-by-step through a complete chart operating cycle, chart marking means including a marking device movable transversely across a chart on said supporting means during each cycle of operation of the mask, means periodically operable for rotating said member, means for moving said mask, means for causing said marking device to perform its marking function when said mask reaches a matching position during its cycle of operation, means operable when the mask structure has reached a matching position to cause the advance of the chart supporting means from one station to the next and to cause the actuation of the record advancing means, and means to advance the chart supporting means a fraction of the distance between stations upon the completion of a full cycle of its movement.

HARVEY D. GIFFEN.